(12) United States Patent
Nemoto et al.

(10) Patent No.: US 6,295,165 B1
(45) Date of Patent: Sep. 25, 2001

(54) LENS DEVICE FOR FORMING A MAGNIFIED ERECT IMAGE

(75) Inventors: Hiroyuki Nemoto; Takashi Kishimoto, both of Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 09/539,077

(22) Filed: Mar. 30, 2000

(30) Foreign Application Priority Data

Mar. 31, 1999 (JP) .................................................. 11-090741

(51) Int. Cl.[7] .................................................. G02B 27/10
(52) U.S. Cl. .............................................. 359/622; 359/621
(58) Field of Search .................................... 359/621, 622, 359/626, 618, 619, 802; 349/73

(56) References Cited

U.S. PATENT DOCUMENTS 6,128,054 * 10/2000 Schwarenberger ...................... 349/73
6,133,687 * 10/2000 Clarke ................................... 313/478

FOREIGN PATENT DOCUMENTS

2000284217-A * 10/2000 (JP) ............................ G02B/27/18

\* cited by examiner

Primary Examiner—Georgia Epps
Assistant Examiner—Saeed H Seyrafi
(74) Attorney, Agent, or Firm—Ratner & Prestia

(57) ABSTRACT

An erect image magnifying lens device having a higher magnification is provided. The erect image magnifying lens device comprises a display element for displaying an image; a fresnel lens provided on the display element for refracting a light emitted by the display element to a direction to magnify the image; an erect image magnifying lens consisted of stacked two micro-lens arrays and positioned in opposition to the fresnel lens; and an image plane positioned in opposition to the erect image magnifying lens, on which the image from the display element is formed.

11 Claims, 5 Drawing Sheets

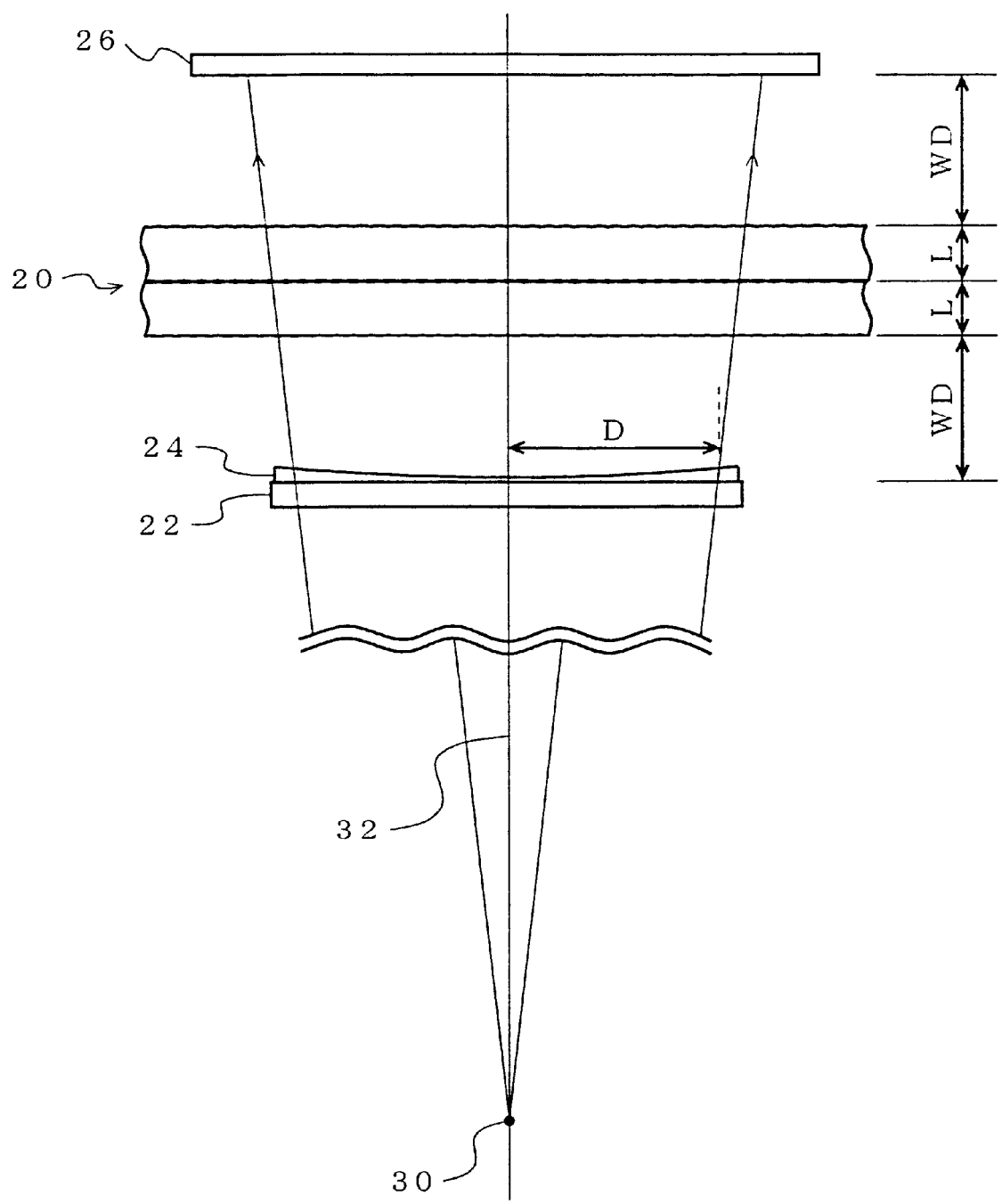
F I G. 4

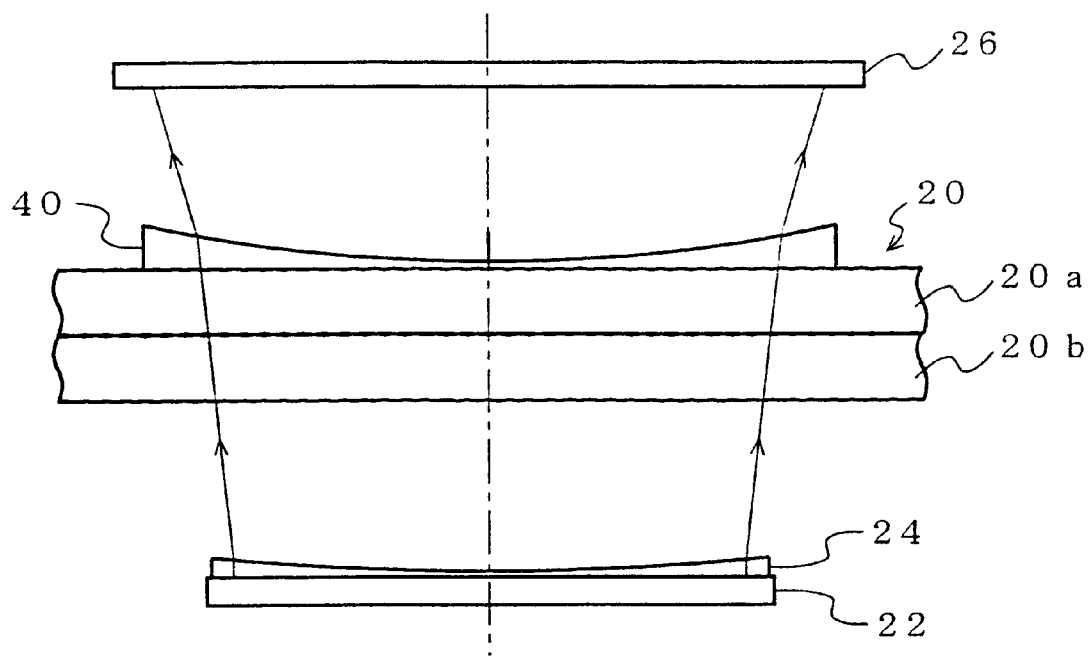
F I G. 6

LENS DEVICE FOR FORMING A MAGNIFIED ERECT IMAGE

FIELD OF THE INVENTION

The present invention generally relates to an erect image magnifying lens device, particularly to an erect image magnifying lens device utilizing a microlens array.

BACKGROUND OF THE INVENTION

One example of a conventional erect image lens devices for magnifying displayed image is a device in which a plurality of distributed-index rod lenses are arranged in one dimension. In this erect image magnifying lens device, each optical axis of the rod lenses is arranged in an angle so as to implement desired magnification of the lens device, and the working distance of each rod lens is adjusted in such a manner that images passed through respective rod lenses are formed on a same plane.

Another example of a conventional erect image magnifying lens device comprises the combination of an erect image, unity magnification lens and a fresnel lens, the erect image, unity magnification lens consisting of a plurality of distributed-index rod lenses arranged in two dimensions on the same plane. FIG. 1 shows such an erect image magnifying lens device. The lens device 8 comprises an erect image, unity magnification lens 10 consisted of a plurality of distributed-index rod lenses arranged in two dimensions on the same plane, a concave fresnel lens 12 positioned within the working distance of the rod lens, a display element 14, and an image plane 16.

According to the lens device 8, the light emitted from the display element 14 is transmitted through the rod lenses 10, is refracted by the concave fresnel lens 12, and reaches to the image plane 16 on which a large magnified image is formed.

In the first conventional lens device comprising the plurality of distributed-index rod lenses arranged in one dimension, it is impossible to form a two-dimensional device because the adjustment of the optical axis angle and the working distance of the rod lens is difficult.

In the second conventional lens device comprising the combination of the erect image, unity magnification lens and the concave fresnel lens, it is difficult to obtain higher magnification since the magnification obtained is only 1.1–1.2 by refracting the light within the working distance of the erect image, unity magnification lens with the concave fresnel lens. When a plurality of erect image magnifying lens devices are arranged in two dimensions to form an image display apparatus having a large screen, if the magnification of the erect image magnifying lens device is low, it is difficult to make a display element small so that the cost of the lens device becomes high. Also, if the light is caused to be refracted by the concave fresnel lens in a large angle so as to obtain a higher magnification, there is a problem such that an image displayed around the peripheral portion of an image plane gets blurred.

While the both of conventional lens devices have the construction utilizing rod lenses, the processing for rod lenses is very difficult.

The object of the present invention, therefore, is to provide an erect image magnifying lens device which may obtain a higher magnification.

Another object of the present invention is to provide an erect image magnifying lens device having a superior image forming capability without decreasing an image quality of the peripheral portion of an image plane.

Still another object of the present invention is to provide an erect image magnifying lens device using a micro-lens array which may be easily formed by a molding process.

SUMMARY OF THE INVENTION

The present invention is directed to an erect image magnifying lens device. This lens device comprises a display element for displaying an image; a fresnel lens provided on the display element for refracting a light emitted by the display element to a direction to magnify the image; an erect image magnifying lens consisted of stacked two micro-lens arrays and positioned in opposition to the fresnel lens; and an image plane positioned in opposition to the erect image magnifying lens, on which the image from the display element is formed.

Each of the micro-lens arrays has a number of spherical micro-lenses arrayed in X-Y matrix on at least one side thereof. At least three spherical micro-lenses may be aligned on a given one of the optical axes of the erect image magnifying lens.

The array pitches of the spherical micro-lenses on respective sides of the two micro-lens arrays are selected so that any of the optical axes which pass through at least three spherical micro-lenses of the erect image magnifying lens are crossed through the back focus of the fresnel lens.

When the angle in which the light emitted from the display element and passed through the fresnel lens goes into the spherical surface of micro-lens without becoming stray light is defined as "an incident angle $\delta$", the incident angle $\delta$ is determined by the dimension of spherical micro-lens. Assuming that an angle between a given optical axis and a main axis line is "an optical axis angle $\theta$", an incident light which is matched to the incident angle $\delta$ at a given optical axis angle $\theta$ comes from the first fresnel lens.

BRIEF DESCRIPTION OF THE DRAWINGS

FIG. 4 shows a drawing for explanation of technical terms used in the description of the embodiment.

FIG. 6 shows another embodiment of an erect image magnifying lens device of the present invention.

DETAILED DESCRIPTION OF THE PREFERRED EMBODIMENT

Figure 1:
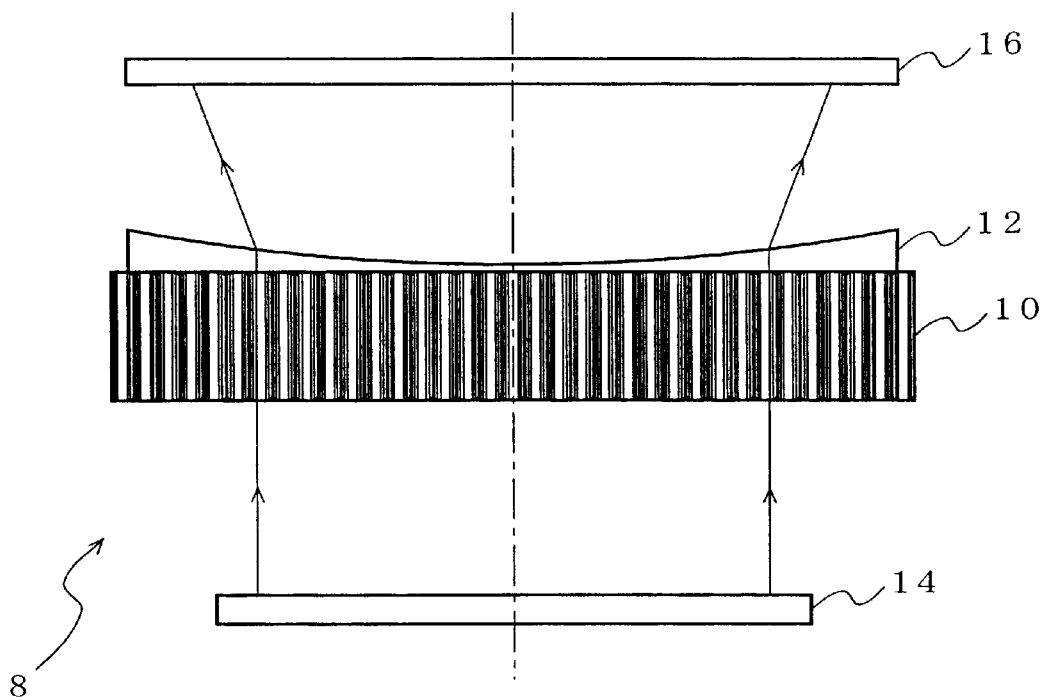
FIG. 1 shows a conventional erect image magnifying lens device.
Figure 2:
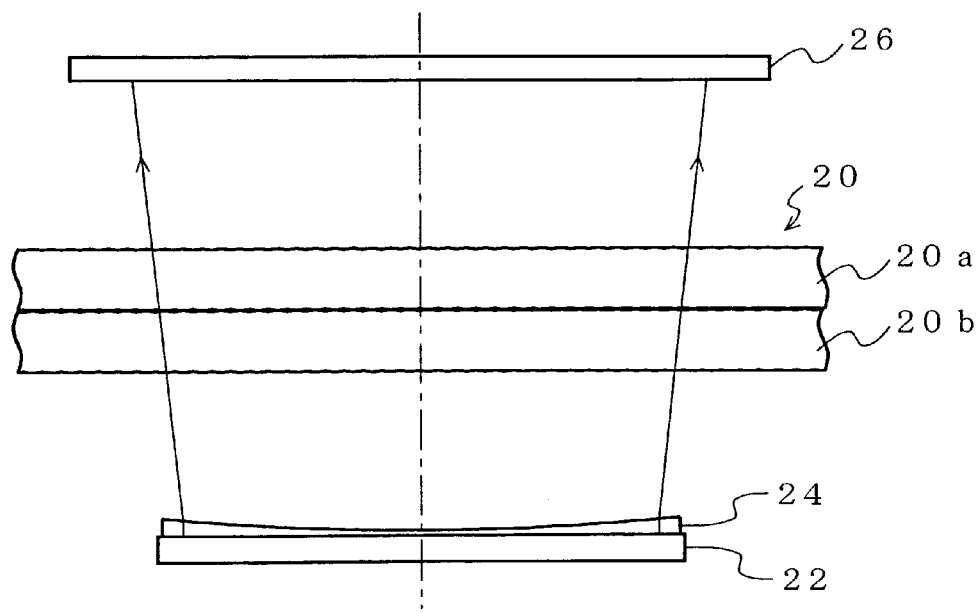
FIG. 2 shows one embodiment of an erect image magnifying lens device of the present invention.

FIG. 2 shows one embodiment of an erect image magnifying lens according to the present invention. The lens device comprises an erect image magnifying lens 20 consisted of two stacked micro-lens arrays 20a, 20b, a display element 22 consisted of a liquid-crystal display element, a concave fresnel lens 24 provided on the display element 22 for changing the proceeding direction of light emitted substantially in parallel from the display element by refracting the light, and an image plane 26 on which a magnified erect image is formed.

Figure 3A:
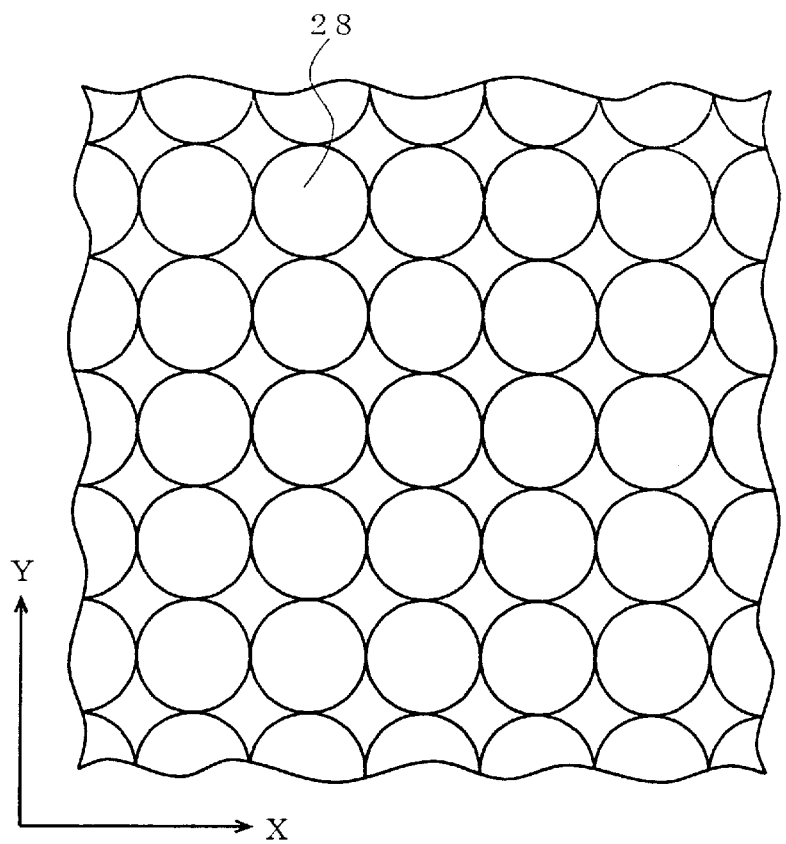
FIG. 3A shows a plan view of one micro-lens array.
Figure 3B:
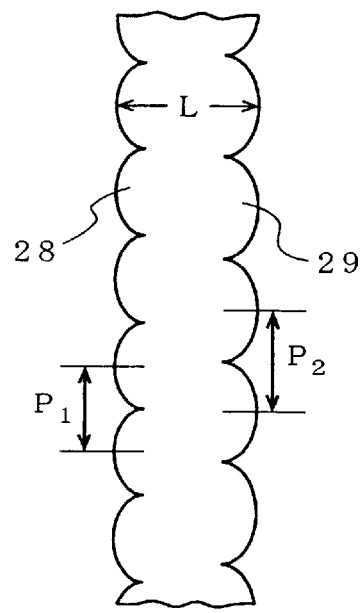
FIG. 3B shows a sectional view of one micro-lens array shown in FIG.3A.

The micro-lens array 20a, 20b may be fabricated with acrylic resin by a molding process, e.g., a 2P molding process and an injection molding process. According to this embodiment, each of the micro-lens array 20a, 20b has a construction such that a number of spherical micro-lenses are arrayed in X-Y matrix on both sides thereof. FIG. 3A shows a plan view of one micro-lens array, and FIG. 3B a sectional view taken along Y-direction in FIG. 3A in which X-Y coordinates are designated. A number of spherical micro-lenses 28, 29 are arrayed with a predetermined pitch in X-Y matrix on both sides of a rectangular plate made of acrylic resin, the array pitches $P_1$, and $P_2$ of micro-lenses 28, 29 on one side and the other side of the plate being different as shown in FIG. 3B. The distance (in a direction perpendicular to the surface of the acrylic resin plate) between the vertexes of the micro-lenses on both sides of the micro-lens array is designated as "L" shown in FIG. 3B.

In this embodiment, the erect image magnifying lens 20 is formed by means of two stacked micro-lens arrays 20a, 20b as described above, and four spherical micro-lenses are aligned on a given one of optical axes of the lens 20. However, in order to implement an erect image magnifying lens, at least three spherical micro-lenses may be aligned on one optical axis.

FIG. 4 is a drawing for explanation of the technical terms used herein. The concave fresnel lens 24 refracts the light emitted from the display element 22 to the spreaded direction, the back focus of the fresnel lens being designated by reference numeral 30 in the figure.

In the erect image magnifying lens 20, each of the array pitches of the micro-lenses on respective sides of the lens 20 is selected so that the optical axes each thereof is formed by at least three micro-lenses are crossed at the same point, this point being referred to as "an optical axes crossed point". The optical axes crossed point should be conformed with the back focus 30 of the fresnel lens 24 so that the light passed through the fresnel lens 24 forms a clarified erect image on the image plane 26. A straight line 32 drawn through the point 30 and perpendicular to the side of the lens 20 is referred to as "a main axis line" herein.

Also, the size of the liquid crystal display element 22 measured from the center of the display area thereof in FIG. 4 is referred to as "a display element size" which is designated by "D" in the figure. "WD" in FIG. 4 shows the working distance of the lens 20.

Figure 5:
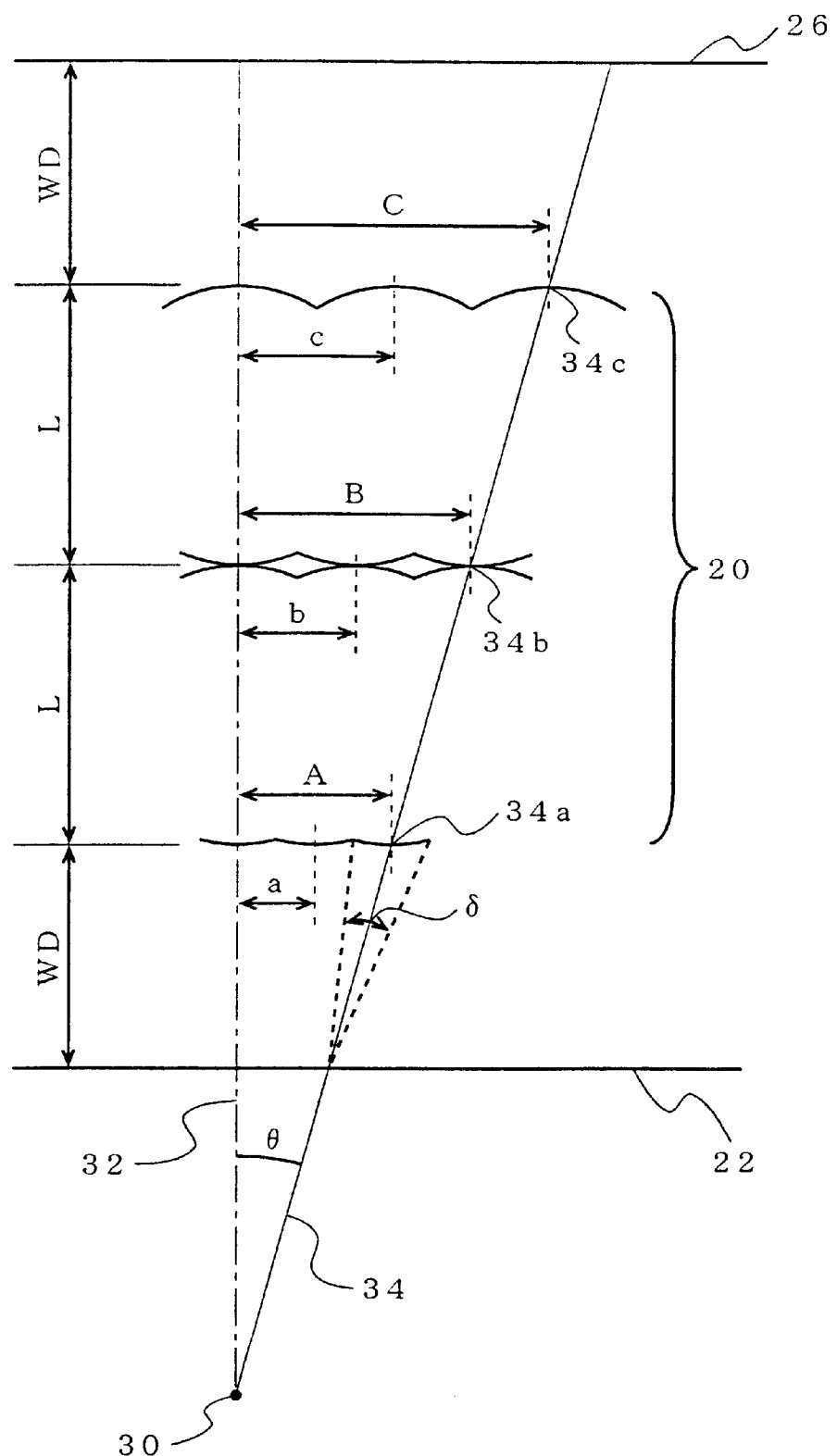
FIG. 5 shows a drawing for explanation of the magnification of the lens device shown in FIG. 2.

The magnification "m" of the erect image magnifying lens device according to the embodiment, is determined by the working distance WD, the distance L between the vertexes of the spherical micro-lenses on both sides of the micro-lens array, and the display element size D. FIG. 5 is a drawing for explanation of magnification "m". As shown in FIG. 5, it is assumed that the array pitch of the spherical micro-lenses on the incident side of the lens 20 is "a", that on the intermediate side is "b", and that on the outgoing side is "c". It is apparent from the figure that both of the array pitches of the spherical micro-lenses on the opposite sides of the micro-lens arrays 20a, 20b are "b".

It is also assumed that the angle between a given one of optical axes 34 and the main axis line 32 is "θ" which is referred to as "an optical axis angle", and the points on which the optical axis 34 is crossed to respective spherical surfaces of the micro-lenses on the incident side, the intermediate side, and the outgoing side of the lens 20 are designated by reference numerals 34a, 34b and 34c, respectively. Assuming that the distances from the main axis line 32 to each of the crossed points 34a, 34b, 34c is "A", "BB" and "C", the distances A, B and C may be calculated respectively by the formulas A=a×n, B=b×n, and C=c×n, wherein n is the essential number of the micro-lenses formed on the sides from the main axis line 32 to the crossed points 34a, 34b and 34c.

Assuming that the ratio between the lens pitches on the incident side, intermediate side, and outgoing side of the lens 20 is "X", each pitch a, c is expressed as a=b ×(1−X), c=b ×(1−X) and the optical axis angle θ is expressed as θ=tan⁻(B×X/L).

If the working distance WD of the lens 20 and the display element size D are given, the magnification "m" of the lens 20 is expressed as m=(B×X×2(WD+L)/L+D)/D.

In the erect image magnifying lens device as described above, the optical axis angle θ may be varied by the area of the spherical micro-lens array and the magnification "m". The angle in which the light emitted from the display element 22 and passed through the fresnel lens 24 goes into the spherical surface of micro-lens without becoming stray light as is shown in FIG. 5 is defined as "an incident angle δ". The incident angle δ is determined by the dimension of spherical micro-lens, such as the radius of curvature of micro-lens, the thickness of micro-lens, etc. The incident light having an angle larger than the incident angle δ becomes stray light, resulting in the decreases of S/N (signal to noise ratio) for a transferred image.

Therefore, considering the image formation by the lens 20, the incident light to the lens 20 is required to be matched to the incident angle δ at a given optical axis angle θ.

FIG. 6 shows another embodiment of the present invention. This erect image magnifying lens device, in addition to the construction of the device shown in FIG. 2, comprises a concave fresnel lens 40 provided on the side opposed to the image plane 26, by which the outgoing light from the lens 20 is refracted to the direction to magnify an image transferred. According to this erect image magnifying lens device, a higher magnification compared to the embodiment shown in FIG. 2 may be implemented.

In the above-described two embodiments, while a liquid crystal display element is used as a display element, EP (electrical panel), PDP (plasma display panel), CRT (cathode ray tube), etc. may be used.

According to the erect image magnifying lens device of the present invention, it has been assured by experiments that the magnification of about 1.5 may be obtained.

While the invention has been particularly shown and described with reference to a preferred embodiment, it will be understood that various changes in form and detail may be made therein without departing from the spirit, and scope of the invention.

What is claimed is:

1. An erect image magnifying lens device comprising:
   a display element for displaying an image;
   a first fresnel lens provided on the display element for refracting a light emitted by the display element to a direction to magnify the image;
   an erect image magnifying lens consisted of stacked two micro-lens arrays and positioned in opposition to the first fresnel lens; and
   an image plane positioned in opposition to the erect image magnifying lens, on which the image from the display element is formed.

2. An erect image magnifying lens device comprising:
   a display element for displaying an image;
   a first fresnel lens provided on the display element for refracting a light emitted by the display element to a direction to magnify the image;

an erect image magnifying lens consisted of stacked two micro-lens arrays and positioned in opposition to the first fresnel lens;

a second fresnel lens provided on the erect image magnifying lens for refracting the light passed through the erect image magnifying lens to a direction to further magnify the image; and an image plane positioned in opposition to the second fresnel lens, on which the image from the display element is formed.

3. The erect image magnifying lens device of claim 1 or 2, wherein the display element and the image plane are positioned within the working distance of the erect image magnifying lens.

4. The erect image magnifying lens device of claim 3, wherein each of the micro-lens arrays has a number of spherical micro-lenses arrayed in X-Y matrix on at least one side thereof.

5. The erect image magnifying lens device of claim 4, wherein at least three spherical micro-lenses are aligned on a given one of the optical axes of the erect image magnifying lens.

6. The erect image magnifying lens device of claim 5, wherein the array pitches of the spherical micro-lenses on respective sides of the micro-lens arrays are selected so that any of the optical axes which pass through the at least three spherical micro-lenses of the erect image magnifying lens are crossed through the back focus of the first fresnel lens.

7. The erect image magnifying lens device of claim 6, wherein the respective number of micro-lenses which are between the points at which the optical axes cross the micro-lenses and a main axis line drawn from the back focus perpendicularly to the side of the erect image magnifying lens, are the same on each side of the erect image magnifying lens.

8. The erect image magnifying lens device of claim 7, wherein an incident angle $\delta$ is larger than the angle in which the light passed through the first fresnel lens spreads out, the incident angle being an angle in which the light emitted from the display element goes into the spherical surface of a given micro-lens.

9. The erect image magnifying lens device of claim 8, wherein assuming that an angle between a given optical axis through the erect image magnifying lens and the main axis line is an optical axis angle $\theta$, an incident light which is matched to the incident angle $\delta$ at a given optical axis angle $\theta$ comes from the first fresnel lens.

10. The erect image magnifying lens device of claim 1 or 2, wherein the micro-lens array is fabricated by a molding process.

11. The erect image magnifying lens device of claim 1 or 2, wherein the display element is a liquid crystal display element.

* * * * *